United States Patent [19]

Takami

[11] Patent Number: 4,575,994

[45] Date of Patent: Mar. 18, 1986

[54] PACKAGE STRAPPING MACHINE

[75] Inventor: Masaho Takami, Hirakata, Japan

[73] Assignee: Shoko Kiko Co., Ltd., Shijonawate, Japan

[21] Appl. No.: 676,404

[22] Filed: Nov. 29, 1984

[30] Foreign Application Priority Data

Dec. 5, 1983 [JP] Japan ............................ 58-229637
Jun. 30, 1984 [JP] Japan ............................ 59-136872
Sep. 21, 1984 [JP] Japan ............................ 59-144024

[51] Int. Cl.⁴ ............................................. B65B 13/02
[52] U.S. Cl. ........................................ 53/582; 53/589
[58] Field of Search .................... 53/582, 589; 100/25, 100/33 PB; 156/73.5, 502

[56] References Cited

U.S. PATENT DOCUMENTS 3,749,622  7/1973  Yoshimasa ........................... 53/582
4,016,023  4/1977  Takami ........................... 100/33 PB Primary Examiner—John Sipos
Attorney, Agent, or Firm—Wenderoth, Lind & Ponack

[57] ABSTRACT

In a package strapping machine, a plate type pivotal member is adapted to turn pivotally on a main shaft held on the base plate of the machine in parallel with the direction in which a strap is forwarded. Two clamps and a pressing device are mounted on a surface of the pivotal member and adapted to move up and down so as to be adapted to press the strap against the under surface of a lateral projection provided on the upper free end of the pivotal member. In cooperation with a side-piece secured to the under surface of the top board of the machine, the pivotal member serves to prevent the strap from breadthwise deviation.

3 Claims, 7 Drawing Figures

PACKAGE STRAPPING MACHINE

The present invention relates to a package strapping machine for tightening a thermoplastic strap looped around a package and welding the overlapping ends of the strap.

Package strapping machines for tightening a thermoplastic strap looped around a package and automatically welding the overlapping ends of the strap are in general use in packaging.

In any of these conventional package strapping machines, a sliding plate is supported by a table on which a package to be strapped is loaded. The sliding plate is movable perpendicularly to the direction in which the strap is fed. Provided under the sliding plate are: a first clamp adapted for pressing the leading end of the strap against the under surface of the sliding plate, a second clamp adapted to move upwardly after tensioning of the strap and press the overlapping portion of the strap against the under surface of the sliding plate prior to the insertion of a heater between the upper and lower straps forming the overlapping portion, a pressing device which presses the overlapping portion of the strap against the under surface of the sliding plate when the heater is inserted between the upper and lower straps forming the overlapping portion, and a cutting blade adapted to cut the lower one of the two straps forming the overlapping portion.

In operation of such a conventional package strapping machine, the strap is drawn out of a reel, wound around a package, and tightened to compress the package when the leading end portion of the strap has been pressed by the first clamp against the under surface of the sliding plate. Then the overlapping portion of the strap is clamped between the upper surface of the second clamp and the under surface of the sliding plate, and the heater is inserted into a space left between the upper and lower straps forming the overlapping portion, which is pressed by the pressing device against the under surface of the sliding plate. Then the lower one of the straps forming the overlapping portion is cut and welded to the upper one, and the sliding plate recedes from between the package and the strap.

Straps used in the package strapping machines have different breadths so as to be fit for various uses according to the sizes and kinds of packages. It is a common practice, therefore, that the pathway for the strap in a package strapping machine is formed so as to allow a strap with a maximum breadth to pass therethrough.

The bonding strength in the overlapping portion of the strap is affected by the area of contact surface with which both ends of the strap are bonded together. In case of a broad strap, a sufficiently large area of contact surface is obtained even if one end of the strap deviates from the other end breadthwise.

However, when such breadthwise deviation occurs in case of a narrow strap such as the one with a breadth of 6 or 9 mm, an extremely small area of contact surface results therefrom, leading to a correspondingly poor bonding strength. Therefore, exact superposition of one end of a strap on the other end thereof is of paramount importance in case of a narrow strap.

On the other hand, a broad strap requires a high-powered mechanism for welding and cutting. This requirement has to be met by a large-sized machine intricate in construction and accordingly expensive in manufacturing cost. It is very uneconomical to use such a large-sized, intricate machine for winding a narrow strap around a package.

Under these circumstances, it is an object of the present invention to provide a package strapping machine which is small-sized, inexpensive, simple in construction, and yet capable of exactly superimposing one end of a strap on the other end without crosswise deviation.

It is another object of the present invention to provide a package strapping machine which is especially suited for winding a narrow strap around a package.

According to the present invention, a main shaft held by the pedestal of the package strapping machine carries a pivotal member. The upper free end of the pivotal member is provided with a support member, against the under surface of which the overlapping portion of a strap is pressed during the strap splicing process. Clamps for clamping the strap in cooperation with the support member, a strap cutter, a strap pressing device, and a cam mechanism that imparts up-and-down motion to these elements are mounted on the pivotal member so as to be disposed directly under the support member. The pivotal member faces a sidepiece when the former is in an upright position. In cooperation with the pivotal member, the sidepiece prevents the strap from breadthwise deviation. A heater which can be inserted and withdrawn from under the support member is disposed at the back of the pivotal member. A strap guide is pivotally mounted on the sidepiece and adapted to recede thereinto when the first clamp is elevated. When the strap guide is in its operative position, the strap guide and the under surface of the support member form a guideway into which the strap is to be inserted. When the strap splicing process is completed, the pivotal member is inclined so as to allow the support member to recede from between the strap and the package.

With the above-described objects in view and as will become apparent from the following detailed description, the present invention will be more clearly understood in connection with the accompanying drawings, in which.

Figure 1:
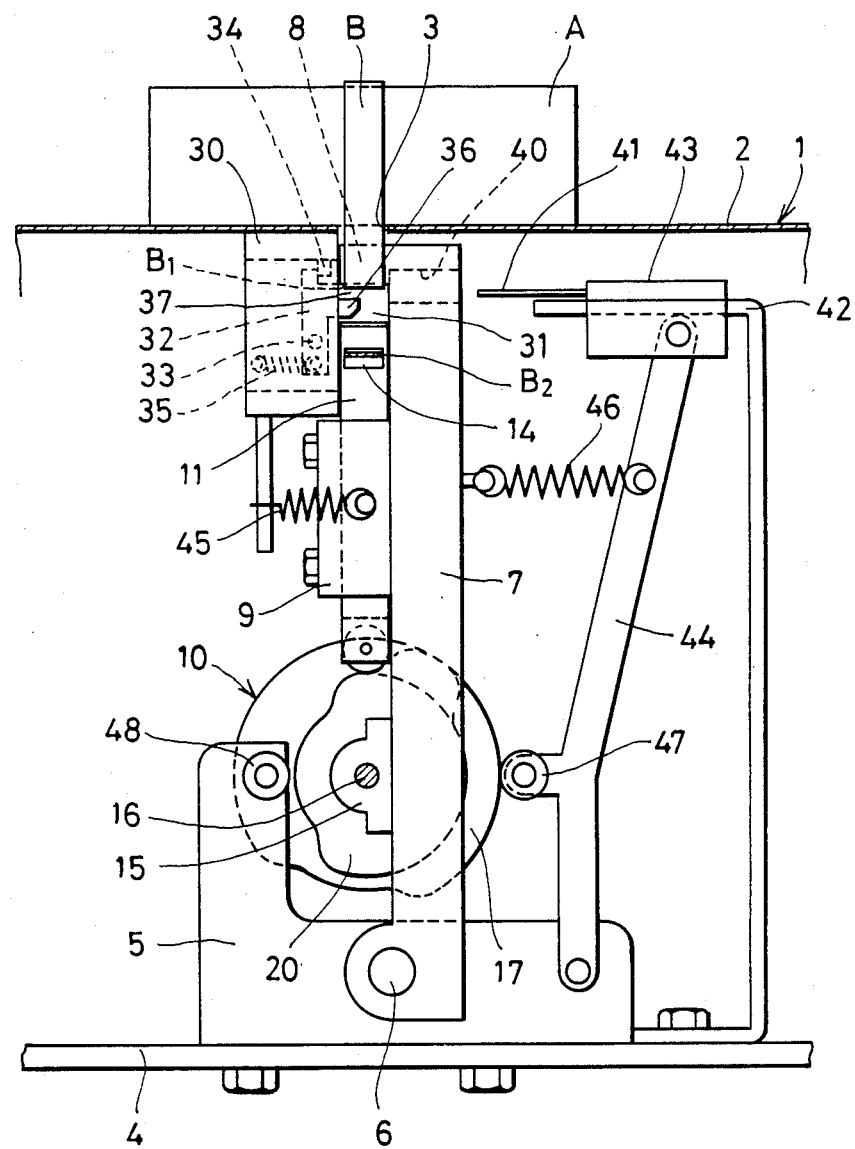
FIG. 1 is a front view of a package strapping machine according to the present invention, illustrating the parts as they appear prior to the operation.

Referring now to the drawings, a package strapping machine in accordance with the present invention includes a table 1 having a top board 2 on which a package A to be strapped is loaded. A thermoplastic strap B is pulled out through an elongated opening 3 provided in the top board 2. The table 1 further has a base plate 4, to which a pedestal 5 is secured in such a position as to be disposed under the elongated opening 3. The pedestal 5 holds a main shaft 6, which runs parallel with the elongated opening 3 and carries a plate type pivotal member 7.

As shown in FIG. 1, the height of the pivotal member 7 in its upright position is nearly equal to the height of the top board 2. When the pivotal member 7 is in this upright position, the left-hand vertical surface of the pivotal member 7 is flush with the right-hand edge of the elongated opening 3. The pivotal member 7 is adapted to turn pivotally in the space left on its right-hand side.

From the upper free end of the pivotal member 7, a support member 8 in the form of a rectangular parallelepiped projects leftwardly, against the under surface of which the overlapping portion of a strap is pressed during the strap slicing process. A holder 9 and a cam mechanism 10 are mounted on the left-hand surface of the pivotal member 7. The holder 9 is disposed under the support member 8, and the cam mechanism 10 is disposed under the holder 9. In case of the embodiment shown in the drawings, the length of the support member 8 measured in the direction traversing the elongated opening 3 is equal to the breadth of the elongated opening 3. By way of example the support member 8 may be 6 or 9 mm long so as to correspond to the breadth of a narrow strap.

Figure 2:
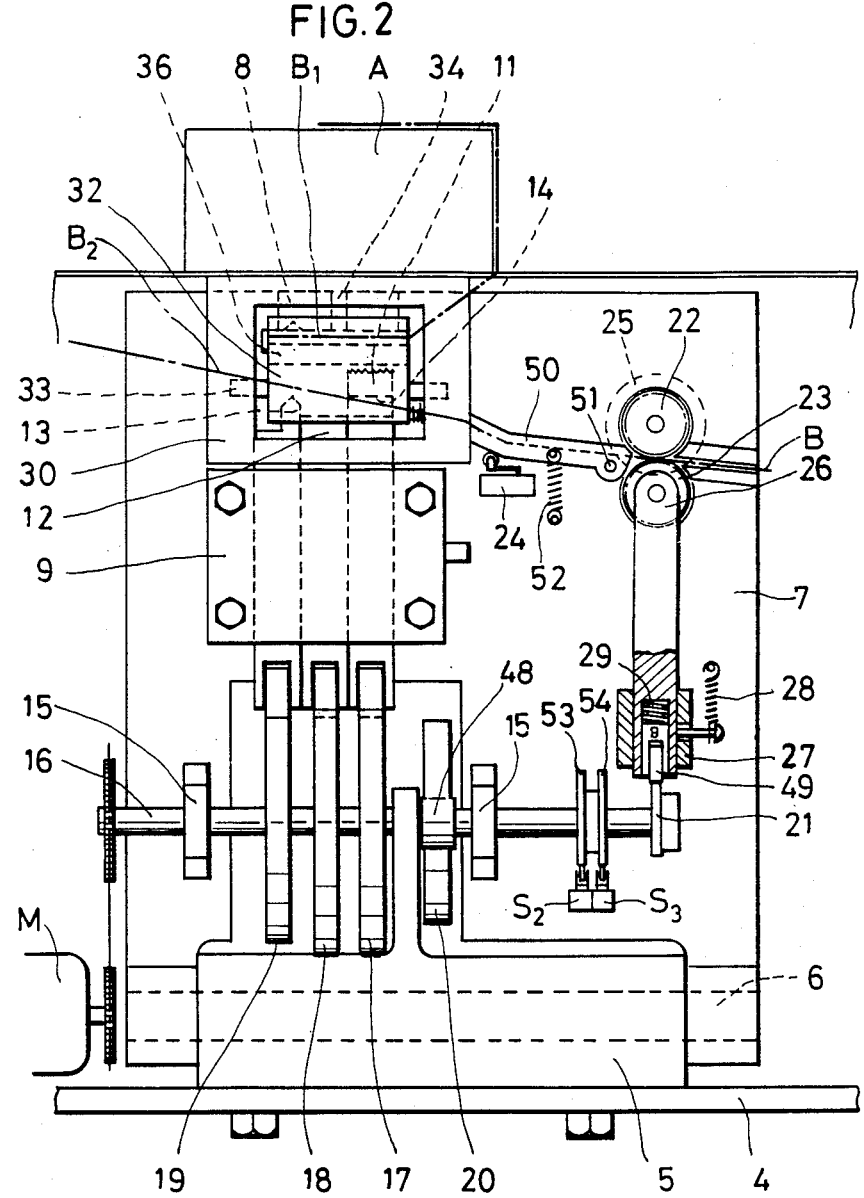
FIG. 2 is a side view thereof.

As shown in FIG. 2, a first clamp 11 adapted to press the leading end $B_1$ of the strap B against the under surface of the support member 8, a second clamp 13 adapted to move upwardly after tensioning of the strap B and press the overlapping portion of the strap B against the under surface of the support member 8 prior to the insertion of a heater 41 between the upper and lower straps forming the overlapping portion, and a pressing device 12 adapted to press the overlapping portion of the strap B against the under surface of the support member 8 after the insertion of the heater 41 between the upper and lower straps forming the overlapping portion are held by the holder 9 so as to be individually capable of up-and-down movement. The lower one of the two straps forming the overlapping portion is designated by $B_2$. The lower strap $B_2$ passes through a hole 14 provided in the first clamp 11 in the proximity of the upper end thereof, and is cut by the upper left-hand edge of the hole 14 (FIG. 2) when the pressing device 12 is elevated.

The cam mechanism 10 includes a pair of bearings 15 secured to the pivotal member 7, a horizontal cam shaft 16 journaled in the bearings 15 and driven by a motor M, cams 17, 18 and 19 mounted on the cam shaft 16 for imparting up-and-down motion to the first clamp 11, pressing device 12 and second clamp 13, respectively, a cam 20 likewise mounted on the cam shaft 16 for causing the pivotal member 7 to turn pivotally on the main shaft 6, and a cam 21 likewise mounted on the cam shaft 16 for controlling a strap forwarding and tensioning mechanism. The up-and-down movement of the first and second clamps 11 and 13, the horizontal movement of the heater 41, the up-and-down movement of the pressing device 12, the horizontal movement of the support member 8, and the up-and-down movement of the strap forwarding and tensioning mechanism are synchronized by the use of cams mounted on the cam shaft 16.

The strap B is pulled out from a reel 57 (FIG. 7) so that the leading end $B_1$ of the strap B may be advanced onto the table 1 through the hole 14 provided in the first clamp 11, through a space left between the under surface of the support member 8 and the upper surfaces of the pressing device 12 and second clamp 13, and through the elongated opening 3.

When the strap B is guided in a clockwise direction around the package A in FIG. 2 until the leading end portion of the strap B reaches the lower edge of the right-hand side of the package A, the leading end portion of the strap B is inserted into the space left under the support member 8.

A strap forwarding and tensioning mechanism is mounted on the pivotal member 7 along the path to be traveled by the strap B up to the hole 14. The strap forwarding and tensioning mechanism includes a driving roller 22, a driven roller 23 urged toward the driving roller 22 by a weak spring 28, a detector 24 for detecting the end of the preliminary tensioning process, and a torque motor 25 having a motor shaft direct-coupled with the driving roller 22 and adapted to rotate in both directions for forwarding and tensioning the strap B. The driven roller 23 is rotatably mounted on the upper end of a slider 26 adapted to vertically slide along a guide block 27 secured to the pivotal member 7.

During the preliminary tensioning process, a low nip pressure is applied to the strap B by the weak spring 28 alone, so that the torque motor 25 can be run under low load and consequently with high starting acceleration so as to permit the reduction of time required for preliminarily tensioning the strap B.

The slider 26 accommodates a strong spring 29 and a roller 49, the latter running on the cam 21. After the preliminary tensioning process, the cam 21 pushes up the roller 49 and compresses the strong spring 29 so as to increase the nip pressure to be applied to the strap B by the rollers 22 and 23.

A strap conduit 50 is arranged between the first clamp 11 and the rollers 22 and 23. The strap conduit 50 is pivotally mounted on a pin 51 so as to be rockable in the vertical direction in response to a change in the tension of the strap B passing through the strap conduit 50. The detector 24 for detecting the strap tension is disposed under the strap conduit 50 so as to be actuated by the vertical rocking motion of the strap conduit 50. By means of a connection with a weak spring 52, the strap conduit 50 is urged to its lowermost position of the travel in the vertical rocking motion, i.e., to the position which represents the slackness of the strap B.

When the strap B is preliminarily tensioned, it will pivot the conduit 50 and thereby actuate the switch 24 for starting the motor 25 so as to subject the strap B to full tensioning.

The switchover of electric circuits occurs at the end of the preliminary tensioning process so as to adapt the torque motor 25 for developing larger torque predetermined for the full tensioning process. This switchover is substantially synchronized with the augmentation of the nip pressure to be applied to the strap B by the rollers 22 and 23.

Figure 6:
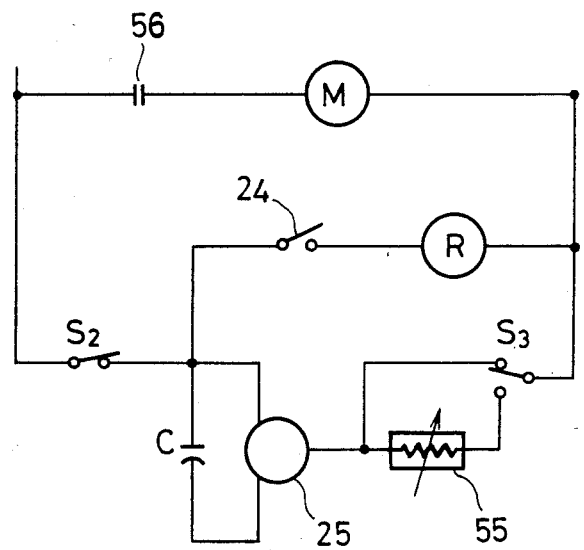
FIG. 6 is an electric circuit for a strap forwarding and tension mechanism.

Referring now to FIG. 6, the electric circuit for the strap forwarding and tensioning mechanism includes a relay contact 56 connected in series with the motor M for driving the cam shaft 16, a switch $S_2$ adapted to be switched on and off by a cam 53 mounted on the cam shaft 16, and changeover switch $S_3$ adapted to be switched on and off by a cam 54 likewise mounted on the cam shaft 16. The switch $S_2$, the torque motor 25 and the changeover switch $S_3$ are connected in series. A phase controller 55 for the torque motor 25 is interposed between the changeover switch $S_3$ and the torque motor 25. The switch 24 and a relay R are connected in series in a shunt circuit tapped from an intermediate point between the switch $S_2$ and the torque motor 25.

Current intensity for the torque motor 25 can be changed by the phase controller 55 so that the torque developed by the torque motor 25 may be controlled. Therefore, the tension to be applied to the strap B by the rollers 22 and 23 in the full tensioning process is determined by the set point in the phase controller 55.

A sidepiece 30 in the shape of a rectangular frame is secured to the under surface of the top board 2. In cooperation with the pivotal member 7, the sidepiece 30 prevents the strap B from breadthwise deviation. As shown in FIG. 1, the pivotal member 7 in its upright position faces the sidepiece 30 in such a manner that the end face of the support member 8 touches the sidepiece 30 so that a guiding space 31 for the breadthwise positioning of the leading end $B_1$ of the strap B may be formed by the under surface of the support member 8, the left-hand surface of the pivotal member 7, and the right-hand surface of the sidepiece 30.

When the pivotal member 7 is in the upright position, the upper portions of the first clamp 11, the pressing device 12, and the second clamp 13 projecting from the holder 9 are placed between the sidepiece 30 and the pivotal member 7.

A strap guide 32 accommodated in the sidepiece 30 is journaled thereto by means of a shaft 33 so as to be adapted to turn pivotally. By the provision of a spring 35, the upper end of the strap guide 32 is normally urged toward abutment with a stopper 34 provided on the sidepiece 30. When the upper end of the strap guide 32 is in abutment with the stopper 34, a guide member 36 provided on the strap guide 32 projects into the guiding space 31. The upper surface of the guide member 36, together with the under surface of the support member 8, forms a guideway 37 restricting a vertical area through which the leading end $B_1$ of the strap B must pass so as to be accurately advanced under the support member 8.

Figure 5:
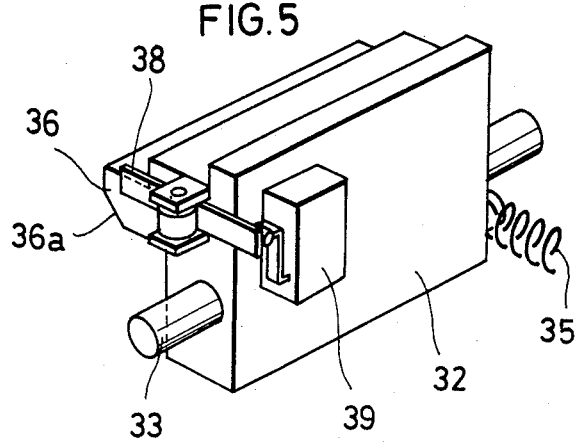
FIG. 5 is a perspective view of the strap guide used therein.

The lower edge of the guide member 36 is bevel faced. When the first clamp 11 is elevated and strikes against the beveled edge 36a (FIG. 5), the guide member 36 is thrusted into the sidepiece 30 so as not to hinder the upward movement of the pressing device 12 and the second clamp 13.

A pivotal lever 38 is provided on the leading end of the strap guide 32. The motor M is energized when the leading end $B_1$ of the strap B is thrusted into the guideway 37 to the extent of pushing the pivotal lever 38. This energization is effected by a switch 39, which is actuated by the pivotal lever 38 when it turns pivotally.

A hole 40 is provided in the pivotal member 7 in the proximity of the support member 8 so as to allow the heater 41 to advance into the guiding space 31 through the hole 40 and recede therefrom.

The pedestal 5 carries a pivotal lever 44. A slider 43 carrying the heater 41 is mounted on the upper end of the pivotal lever 44. When pivotal motion is imparted to the pivotal lever 44 by the cam mechanism 10, the slider 43 slides on the upper horizontal portion of a guide bar 42 secured to the base plate 4 and thereby the heater 41 is allowed to advance into and recede from the hole 40.

The pivotal member 7 is normally urged toward its upright position by the provision of a spring 45. The heater 41 is normally urged toward advancing into the guiding space 31 by the provision of a spring 46. The cam 17, in cooperation with a roller 47 mounted on the lower part of the pivotal lever 44, imparts pivotal motion to the pivotal lever 44. Thus the embodiment shown in the drawings makes the cam 17 serve a double purpose of imparting up-and-down motion to the first clamp 11 and horizontal motion to the heater 41. However, a cam for the first clamp 11 may be mounted on the cam shaft 16 separately from another cam for the heater 41.

Figure 4:
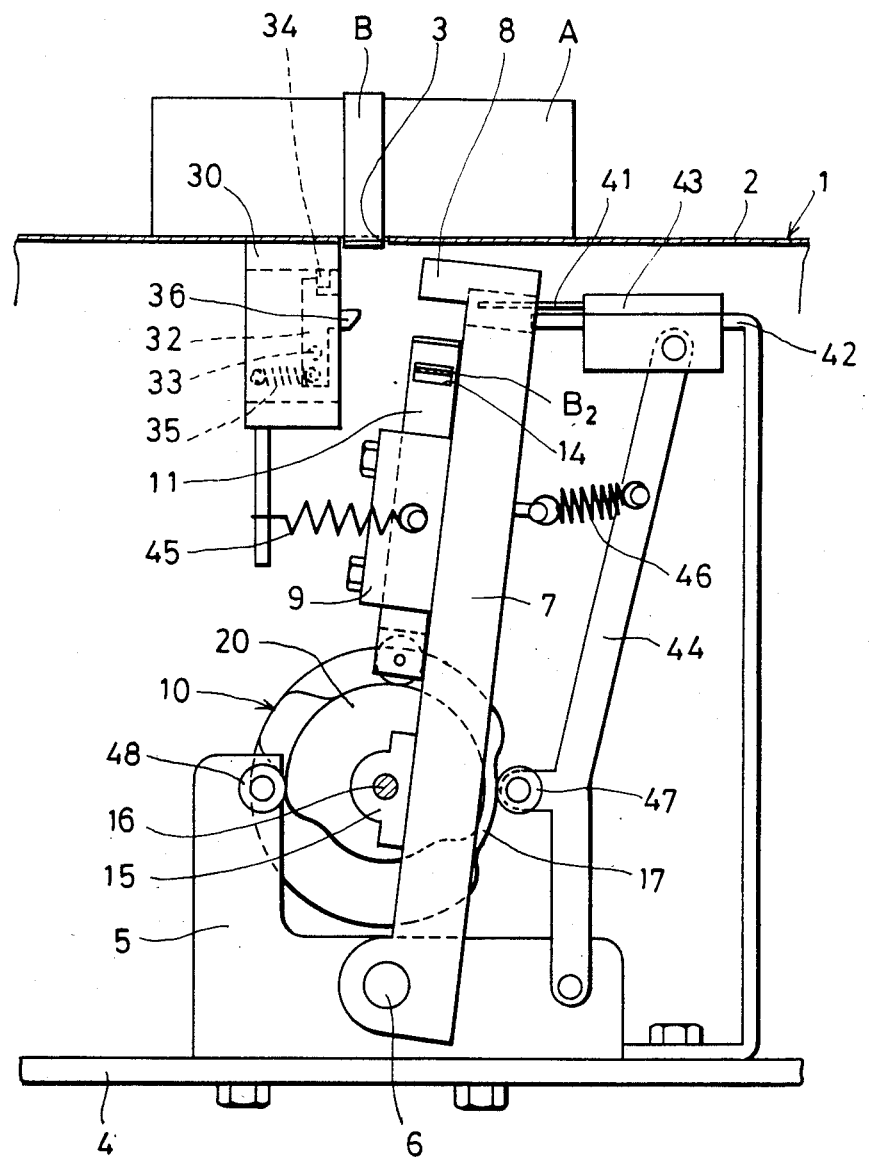
FIG. 4 is a front view thereof, illustrating the parts as they appear when the welding process is completed.

The edge of the cam 20 moves against a roller 48 mounted on the pedestal 5. When the large-diameter portion of the cam 20 is on the roller 48, the pivotal member 7 is in an inclined position as shown in FIG. 4.

Figure 7:
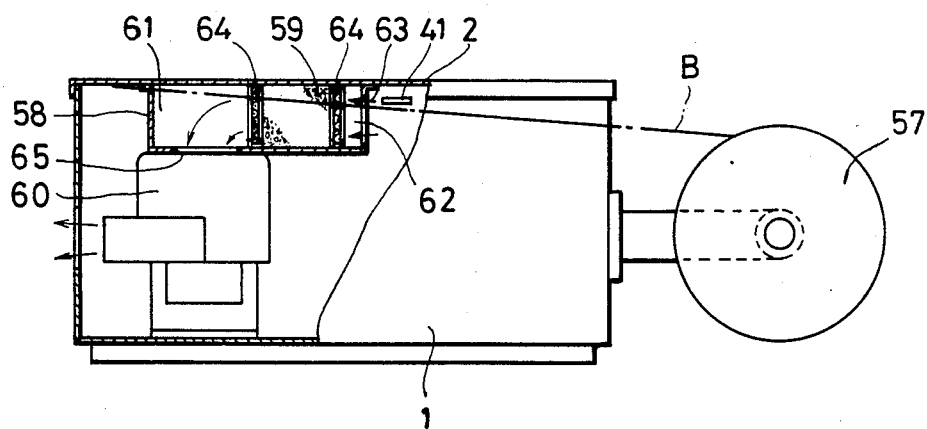
FIG. 7 is a side view of the package strapping machine, illustrating an apparatus for removing a bad smell given out when the strap is heated by the heater.

Referring now to FIG. 7, a bad smell given out when the strap B is heated by the heater 41 is removed by an apparatus allotted for that purpose. This apparatus includes a casing 58 secured to the under surface of the top board 2 on the delivery side of the guideway 37 (FIG. 1), a deodorant 59 such as activated charcoal contained in the middle one of three compartments of which the interior of the causing 58 consists, and an exhauster 60 disposed under a compartment 61 provided on the delivery side of the middle (deodorization) compartment.

The causing 58 is in the shape of a rectangular box having an opening at the upper end and detachably mounted on the under surface of the top board 2 by means of screws or the like. A compartment 62 provided on the feed side of the middle compartment has an inlet port 63 in the wall facing the heater 41. A pair of wire nets 64 divide the middle compartment from the compartments 61 and 62. The compartment 61 communicates with the exhauster 60 by an outlet port 65. The air impregnated with a bad smell is removed from within the package strapping machine as shown with arrows in FIG. 7.

Prior to the operation, the first clamp 11, the pressing device 12 and the second clamp 13 are at the bottom of their strokes as shown in FIG. 2. The driven roller 23 is kept apart from the driving roller 22. The pivotal member 7 is in an upright position as shown in FIG. 1.

In operation, the strap B is drawn out to the extent of being looped around the package A placed on the top board 2. Then the leading end $B_1$ of the strap B is advanced into the guideway 37. The leading end $B_1$ is allowed to make a straight advance into the guideway 37, because the vertical area through which the leading end $B_1$ is allowed to pass is restricted (as shown in FIG. 1) by the left-hand surface of the pivotal member 7, the right-hand surface of the sidepiece 30, the under surface of the support member 8, and the upper surface of the guide member 36. Thus the breadthwise positioning of the leading end $B_1$ relative to the lower strap $B_2$ passing through the hole 14 provided in the first clamp 11 is effected.

Figure 3:
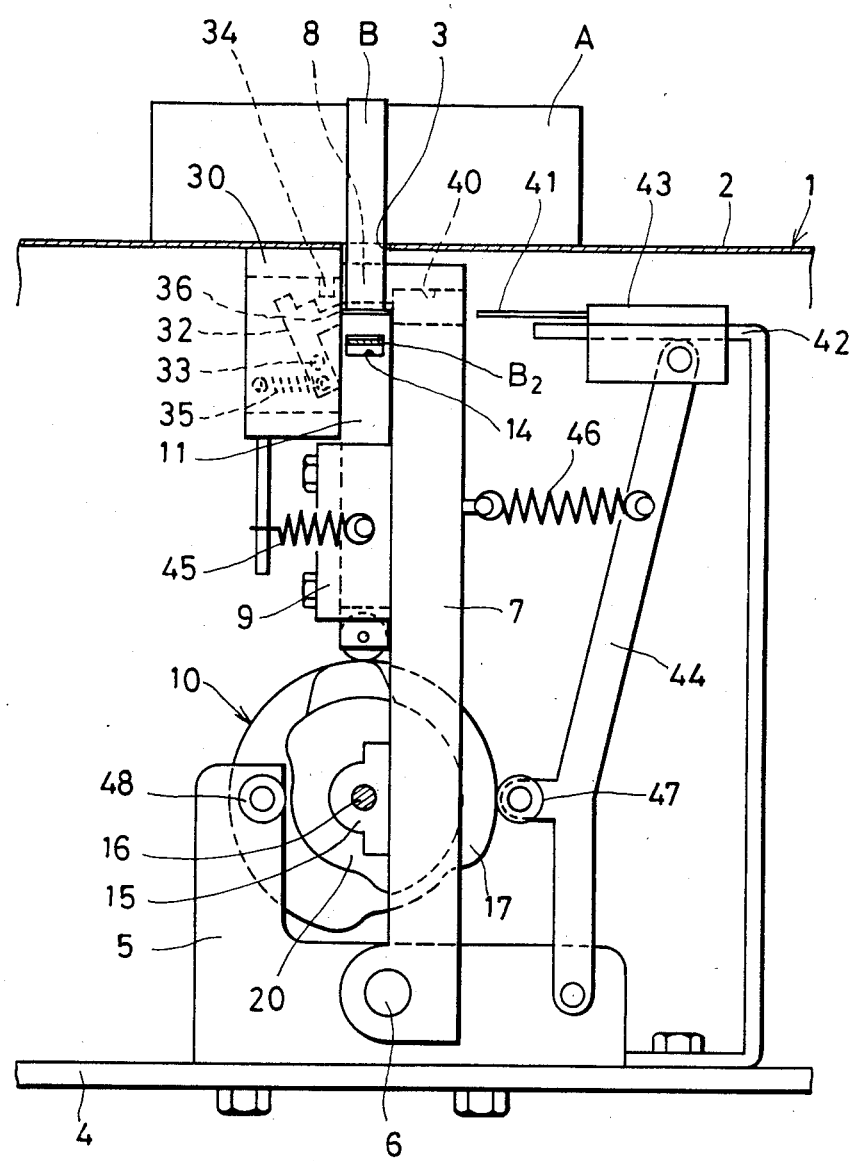
FIG. 3 is a front view thereof, illustrating the parts as they appear during the welding process.

When the leading end $B_1$ pushes the pivotal lever 38, the switch 39 actuated by the pivotal lever 38 starts the motor M. Then the cam shaft 16 rotates, and the first clamp 11 is elevated and presses the leading end $B_1$ against the under surface of the support member 8 as shown in FIG. 3.

In course of upward movement, the first clamp 11 strikes against the beveled edge 36a (FIG. 5) of the guide member 36. Consequently the strap guide 32 is thrusted into the sidepiece 30 as shown in FIG. 3.

·Then the motor M stops temporarily and the preliminary tensioning process begins, which is carried out by pulling the strap B rightwardly in FIG. 2 by means of the rollers 22 and 23. During this process, the roller 49 is not yet pushed up by the cam 21, and the nip pressure is applied to the strap B by the weak spring 28 alone, so that the torque motor 25 can be run under low load and consequently with high starting acceleration.

The preliminary tensioning process ends with the switch 24 detecting the tension of the strap B which has come up to the degree predetermined for the preliminary tensioning.

The relay R is actuated when the switch 24 is switched off. Then the relay contact 56 closes and the motor M is energized so as to resume revolution of the cam shaft 16. Then the changeover switch $S_3$ is actuated by the cam so as to energize the torque motor 25 through the phase controller 55. At the same time, the cam 21 pushes up the roller 49 and compresses the strong spring 29 so as to increase the nip pressure to be applied to the strap B by the rollers 22 and 23. Then the full tensioning process begins, which ends when the tension of the strap B has come up to the degree predetermined for the full tensioning.

Then the second clamp 13 is elevated, and thereby the upper and lower straps $B_1$ and $B_2$ forming the overlapping portion of the strap B are clamped between the upper surface of the second clamp 13 and the under surface of the support member 8.

When the pressing device 12 is elevated, the lower strap $B_2$ is cut by the upper left-hand edge of the hole 14 (FIG. 2), and the cut end portion of the lower strap $B_2$ extending rightwardly from the second clamp 13 is pushed up by the pressing device 12.

Simultaneously with the upward movement of the pressing device 12, the cam 17 imparts horizontal movement to the heater 41 so as to insert it between the upper and lower straps $B_1$ and $B_2$ through the hole 40 provided in the pivotal member 7. The pressing device 12 presses the overlapping portion of the strap B against the under surface of the support member 8 with the heater 41 held between the upper and lower straps $B_1$ and $B_2$. The pressing causes suitable contact of the heater with the overlapping strap surfaces, thereby suitably fusing the strap surfaces.

The heater, upon completion of the strap melting, is withdrawn from between the overlapping portion. After withdrawal of the heater, the pressing continues until the overlapping portion becomes welded.

Then the first clamp 11, the pressing device 12 and the second clamp 13 descend to their initial positions, and the strap guide 32 is also restored to its initial position so as to allow the guide member 36 to project again into the guiding space 31 as shown in FIG. 1.

When the large-diameter portion of the cam 20 runs on the roller 48, the pivotal member 7 is inclined in such a direction as to depart from the sidepiece 30 as shown in FIG. 4. Consequently the support member 8 recedes from between the package A and the strap B. Then the motor M stops.

The torque motor 25 is started in such a direction as to forward the strap B. The torque motor 25 stops when a predetermined length of the strap B has been forwarded onto the table 1 by the driving and driven rollers 22 and 23. The driven roller 23 is detached from the driving roller 22 so as to make the strap B ready for being pulled out from the reel 57 (FIG. 7) in preparation for the next strapping operation.

The package strapping machine in accordance with the present invention has the following advantages:

1. Becasue of a unique construction in which the principal elements are mounted on the pivotal member 7, the package strapping machine can be made compact and the manufacturing cost can be reduced.

2. The upper strap $B_1$ can be exactly superimposed on the lower strap $B_2$, because the breadthwise deviation is prevented by the opposite surfaces of the pivotal member 7 and the sidepiece 30.

3. Since the upper strap $B_1$ can be exactly superimposed on the lower strap $B_2$, both straps $B_1$ and $B_2$ are bonded together with the largest area of contact surface and thereby with the largest bonding strength especially in case of a narrow strap with a breadth of 6 or 9 mm.

What is claimed is:

1. A package strapping machine comprising a top board on which a package to be strapped is loaded and having an elongated opening therein for allowing a strap which is to be strapped around a package to be pulled therethrough, a base plate disposed under said top board, a main shaft held on said base plate in parallel with the elongation of said opening, a pivotal member adapted to transversely turn pivotally on said main shaft and having a lateral projection on its upper free end for allowing an overlapping portion of said strap to be fed beneath said lateral projection parallel to said elongated opening to be pressed against the under surface of said lateral projection, the length of said lateral projection measured in the direction traversing the path along which said strap is fed being substantially equal to the breadth of said strap, two clamps and a pressing means mounted on said pivotal member under said lateral projection and adapted to move up and down so as to press said strap against the under surface of said lateral projection, a cam mechanism mounted on said pivotal member under said two clamps and said pressing means so as to impart up-and-down motion to said two clamps and said pressing means, a welding means for welding said overlapping portion, and a sidepiece secured to the under surface of said top board and having a surface flush with a longitudinal edge of said elongated opening, means for pivoting said pivotal member to an upright position so that the end face of said lateral projection contacts said surface of said sidepiece thereby forming a guideway through which the strap is inserted beneath said lateral projection.

2. A package strapping machine as set forth in claim 1, wherein the height of said pivotal member in its upright position is sufficient to nearly reach said top board.

3. A package strapping machine as set forth in claim 1, wherein one of said clamps and said pressing means together form a cutting means.

* * * * *